Dec. 19, 1961 C. H. WIKLUND 3,013,354
PRE-POPPED SLIDE AND METHOD OF MAKING
Filed Feb. 14, 1958 3 Sheets-Sheet 1
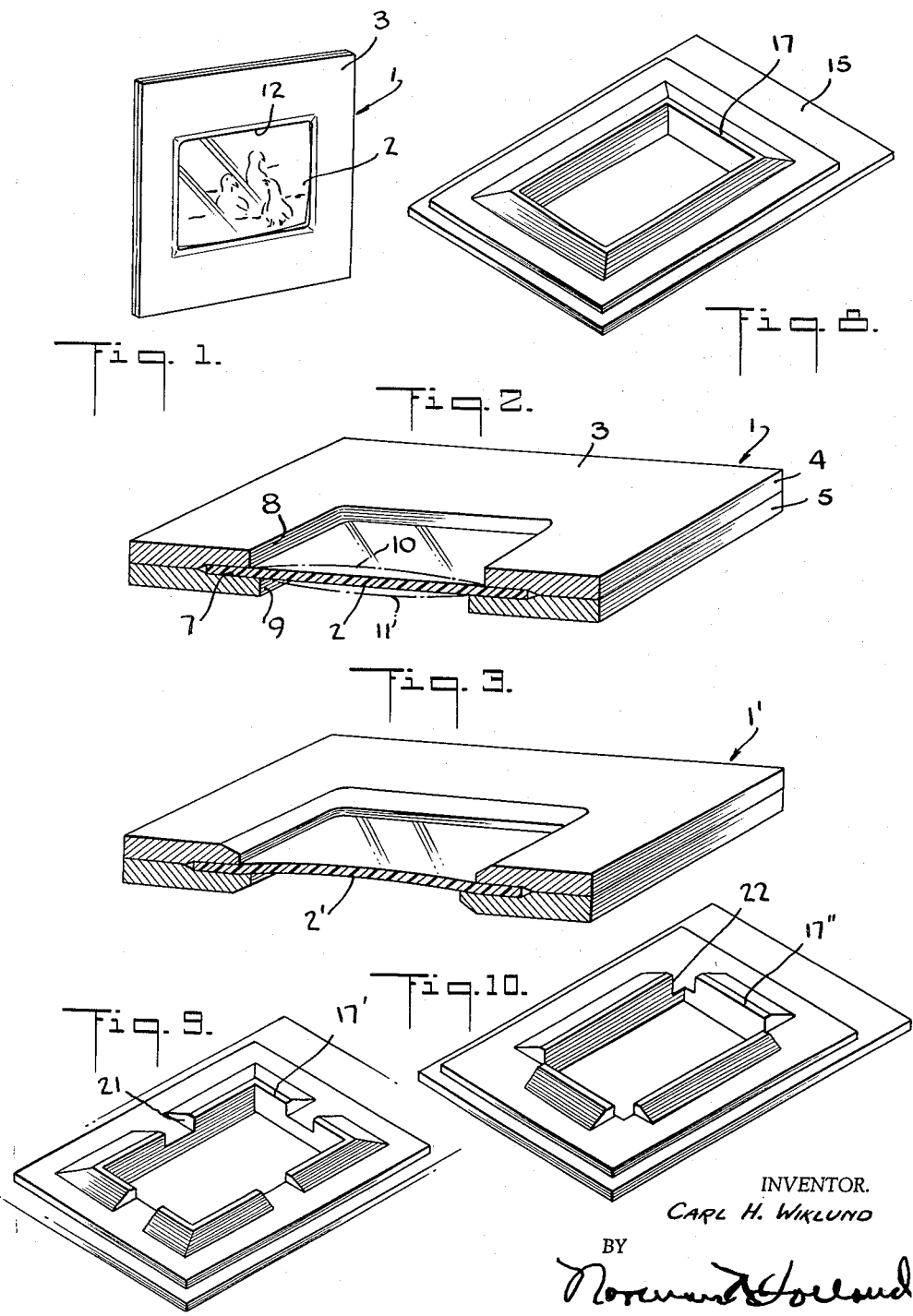
INVENTOR.
CARL H. WIKLUND
BY
ATTORNEY Dec. 19, 1961 C. H. WIKLUND 3,013,354
PRE-POPPED SLIDE AND METHOD OF MAKING
Filed Feb. 14, 1958 3 Sheets-Sheet 2

INVENTOR.
CARL H. WIKLUND
BY
ATTORNEY

Dec. 19, 1961 C. H. WIKLUND 3,013,354
PRE-POPPED SLIDE AND METHOD OF MAKING
Filed Feb. 14, 1958 3 Sheets-Sheet 3
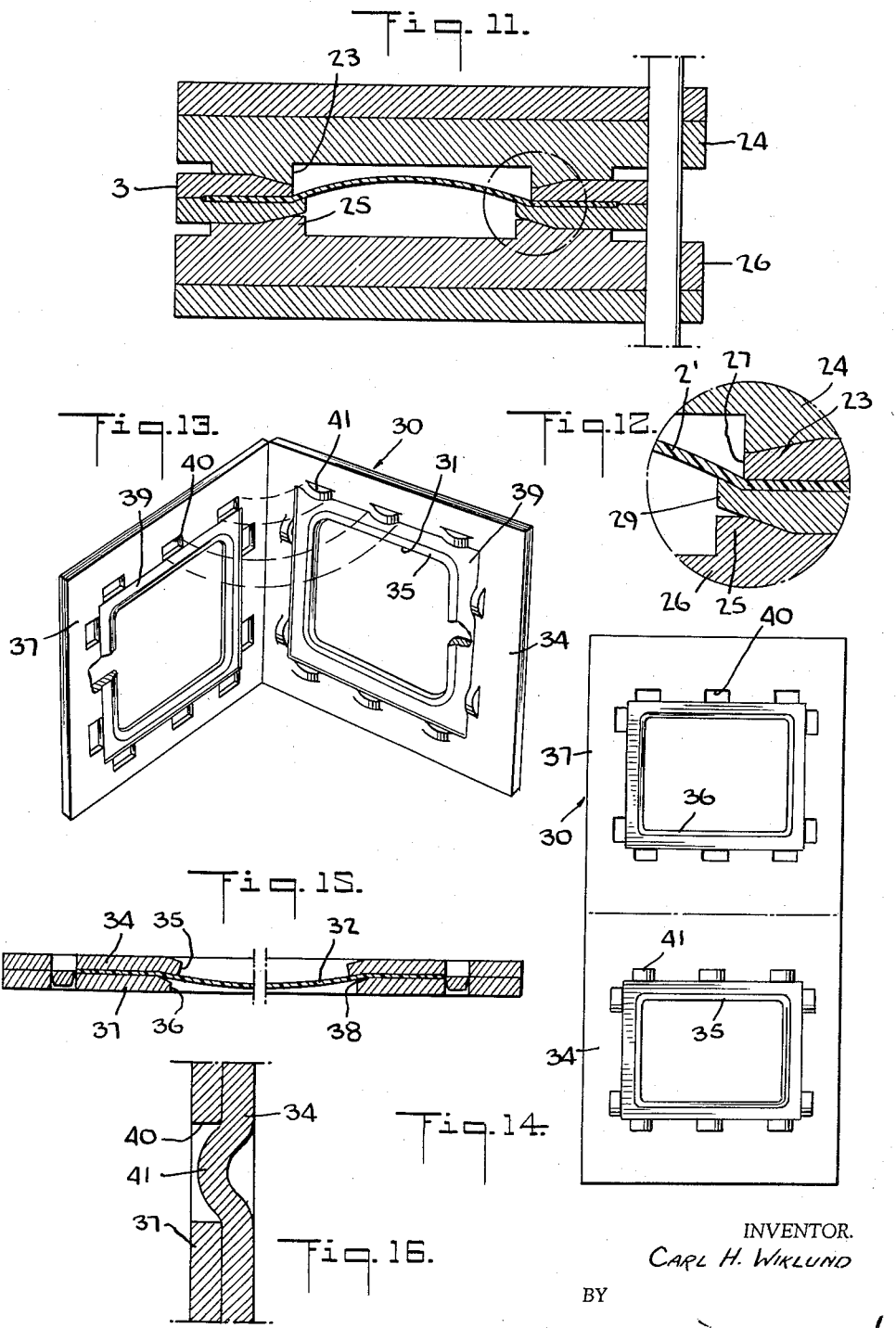
INVENTOR.
CARL H. WIKLUND
BY
ATTORNEY

United States Patent Office 3,013,354
Patented Dec. 19, 1961

3,013,354
PRE-POPPED SLIDE AND METHOD OF MAKING
Carl H. Wiklund, New Rochelle, N.Y., assignor to Airequipt Manufacturing Co., Inc., New Rochelle, N.Y., a corporation of New York
Filed Feb. 14, 1958, Ser. No. 715,383
5 Claims. (Cl. 40—152)

This invention relates to slides for use in projectors or viewers and more particularly to a method and means for preventing the defocusing of the slides during their exhibition due to the shifting or flexing of the transparencies within their mounts. This commonly encountered problem is known as "popping," as the transparencies flex or pop from one position to another within their mounting frame. Transparencies which are focused when they are first moved into the projection or viewer light beam often become defocused after a short exposure to the heat of the projector or viewer lamp due to their shifting or popping within their mount.

This popping action is annoying to the viewers as the lens must be continually refocused, and it is particularly undesirable in automatic types of slide projectors where the operator normally sits some distance from the projector so that refocusing is impossible.

One of the causes of popping is believed to result from the absorption of moisture by the emulsion on the film during storage. This causes the emulsion layer to expand, thereby stressing the transparency and bowing or bending it outwardly toward the emulsion layer. When the transparency is heated during exposure, the moisture evaporates, causing the emulsion layer to contract so that the transparency curves or pops in the opposite direction.

Another factor which is believed to cause popping is the expansion of the center portion of the transparency due to the heat of the display lamp while the cooler and confining slide frame or mount remains relatively unchanged in size. The expanding transparency curves or pops from one position to another as a result of this unequal expansion.

It has been discovered that this objectionable popping may be eliminated by the curving of the edges of the transparency so that the transparency assumes a permanent three-dimensional bow or compound curvature which resists subsequent popping tendencies from all causes.

Accordingly, it is an object of the present invention to provide an improved method for preventing popping in slides.

Another object of the present invention is to provide an improved method for mounting transparencies to eliminate popping.

Another object of the present invention is to provide a relatively simple and inexpensive method of prepopping slides using their original mounts.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view of a slide according to the present invention;

FIG. 2 is a perspective view in section of a slide prior to its being curved in accordance with the method of the present invention;

FIG. 3 is a perspective view in section of a transparency pre-popped in accordance with the present invention;

FIG. 8 is a perspective view of a forming jaw corresponding to the jaws illustrated in FIGS. 4–7;

FIGS. 9 and 10 are other embodiments of the forming jaws in accordance with the present invention;

FIG. 11 is a diagrammatic sectional view of another embodiment of the forming jaws performing a pre-popping operation on a slide in accordance with the present invention;

FIG. 12 is an enlarged detailed sectional view of the edge of the slide aperture corresponding to FIG. 11;

FIG. 13 is a perspective view of another embodiment of the pre-popping method and means of the present invention in which the film shaping surfaces are pre-formed in the slide mount;

FIG. 14 is a top plan view of the mount illustrated in FIG. 13;

FIG. 15 is a sectional view of the mount illustrated in FIGS. 13 and 14 with a transparency mounted therein and curved thereby; and FIG. 16 is an enlarged detailed sectional view of an indexing tab on the mount illustrated in FIG. 15.

Figure 4:
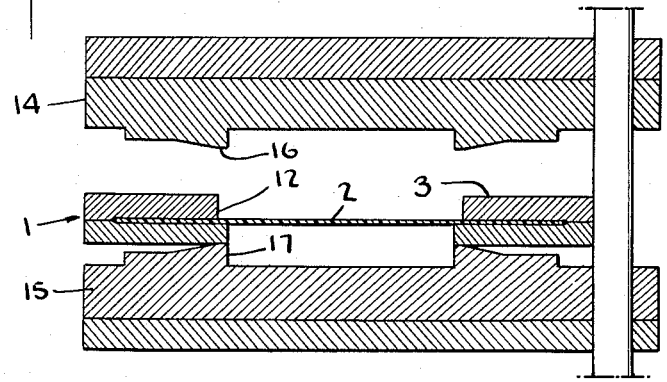
FIGS. 4–6 are diagrammatic sectional views illustrating a preferred embodiment of the pre-popping method and means of the present invention.

FIGS. 1 and 2 illustrate a slide 1 including a transparent film 2 and a mount 3. Slides such as the slide 1 are in common use in photography such as, for example, 35 mm. color transparencies in which the transparent film 2 is mounted for viewing in a suitable mount 3. By the method and means of the present invention, the transparency 2 of the slide 1 is pre-popped to prelude popping and defocusing during viewing as will now be described with particular reference to FIGS. 3–8. The slide 1, as illustrated in FIG. 2, is in the form in which it is presently prepared for viewing by the film processing laboratories. In these slides the film transparency 2 is cut into a suitable size, and it is mounted between the cooperating sides 4 and 5 of the mount 3. The transparency 2 is fitted in a suitably shaped slot 7 formed by cooperating grooves formed at the edges of the apertures on facing surfaces of the mount sections 4 and 5, and the mount sections 4 and 5 are thereafter fastened together. The sides 4 and 5 of the mount 3 have apertures 8 and 9, respectively, which cooperate to form the aperture 12 in the mount 3. The aperture 9 is made slightly smaller so that its edges clearly define or frame the projected or viewed picture. When thus mounted, the transparency 2, as more fully described above, has a tendency to flex or pop during its exhibition between the position shown by solid lines and the alternate positions indicated generally by the dash-dot lines 10 and 11.

FIG. 3 illustrates a slide 1' which has been pre-popped in accordance with the method and means of the present invention. The transparency 2' in the slide 1' of FIG. 3 has an upwardly bowed shape so that its surface has a generally upwardly directed convex surface or compound curvature. The method and means of providing this prepopped shape for the transparency 2' on a conventional transparency 3, such as is illustrated in FIG. 2, will now be described with particular reference to FIGS. 4–7.

Figure 5:
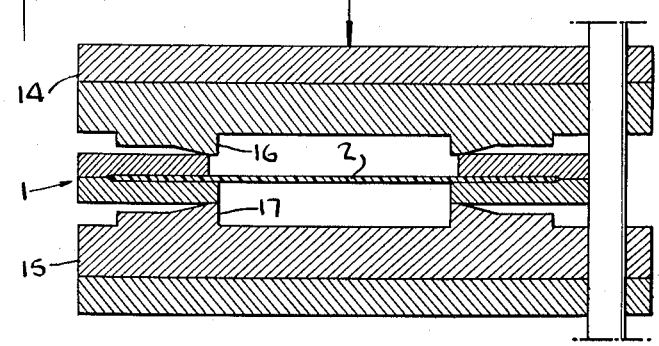
Figure 6:
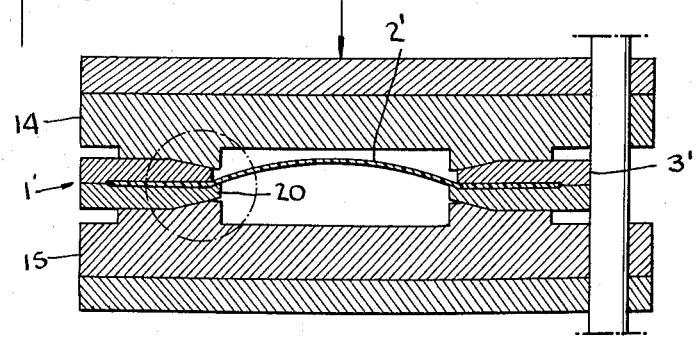
Figure 7:
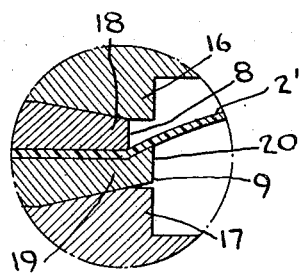
FIG. 7 is an enlarged detailed view in section of the edge portion of the slide aperture corresponding to FIG. 6.

The slide 1 illustrated in FIG. 4 is a conventional slide having a transparent film 2 and a cardboard mount 3. In FIG. 4 the slide 1 has been placed between cooperating forming jaws 14 and 15 preparatory to the popping operation. These jaws 14 and 15 are mounted on a suitable press means, not shown, so that they may be closed on opposite sides of the transparency 3 under pressure. When the forming jaws 14 and 15 are closed on the slide 1, as is illustrated in FIGS. 5 and 6, the generally rectangular pressure ridges 16 and 17 (FIG. 8)

cooperate to compress the paper board mount 3 around the edge of the aperture 12. As illustrated most clearly in FIG. 7, the upper pressure ridge 16 compresses the upper section 4 of the mount 3 downwardly adjacent its aperture 8 at the same time that the lower pressure ridge 17 compresses the lower section 5 adjacent its aperture 9. Portions 18 and 19 of the upper and lower sections 4 and 5 of the mount 3 are compressed between the cooperating pressure ridges 16 and 17 while the inner edge 20 of the lower section 5 bulges upwardly against the edges of the transparency 2 due to the outward and upward escape of the mount material from between the compressed portions 18 and 19. This upwardly bulging portion 20 forces the edge of the transparency 2 upwardly around the perimeter of the aperture 12, causing the film to be bowed upwardly and causing it to have an upwardly facing convex shape as illustrated at 2' in FIGS. 6 and 7. When the forming jaws 14 and 15 are withdrawn from the popped slide 1', the cardboard mount 3' retains the shape given it by the forming jaws 14 and 15 and the transparency 2' now has a permanent three-dimensional bow or convex shape. When thus shaped, the transparency 2' has been found to resist further changes due to any combination of heat or moisture, and the tendency of the transparency 2 to pop is eliminated. A preferred embodiment of the forming jaw 15 is illustrated in FIG. 8 showing the rectangular pressure ridge 17 which is completely shaped to surround the aperture 12 in the slide 1. Other embodiments of the forming jaws are illustrated in FIGS. 9 and 10 in which the pressure ridge 17' and 17", respectively, is interrupted by gaps 21 and 22. These gaps result in unshaped sections at the edge of the slide aperture 12; however, the portions of the pressure ridges 17' and 17" intermediate the gaps 21 and 22 have been found to provide adequate shaping of the transparency 2 to eliminate popping by causing a permanent three-dimensional bow or a compound curvature in the transparency 2.

The above described method is a preferred embodiment of the method where the mount is formed of the conventional mounting cardboard or a similar material. Where the mount 3 is formed of a bendable material, the bulge or lip which forces the transparency 2 into its curved shape may be an upwardly curved or bent lip formed by the bending of the edge of the aperture upwardly by suitable dies in a generally similar manner.

It is clear that the above-described method may be performed simultaneously with the mounting of the transparency 2 in the mount 3.

Another embodiment of the forming jaws is illustrated in FIGS. 11 and 12 in which the pressure ridge 23 on upper jaw 24 differs from the pressure ridge 25 on the lower plate 26. As more clearly seen in the detailed FIG. 12, the upper pressure ridge 24 terminates at the edge 27 of the upper aperture and it insures a satisfactory compression of the mounting frame 3 at this point. The lower pressure ridge 25 extends to the edge of the mounting plate aperture to insure an upward direction to the raised or upwardly directed bulge 29 which engages the transparency 2'.

FIGS. 13–16 illustrate another embodiment of the method in which the mounting frame 30 which is formed of paper board, metal, plastic, or other suitable material has the edges of its aperture 31 preformed with suitable transparency curving surfaces prior to the mounting of the transparency 32 in the mounting frame 30. As illustrated in FIG. 15, the side 34 of the mounting frame 30, having an aperture 35 which is slightly smaller than the aperture 36 of the frame portion 37, is bent or curved so that it curves downwardly (FIG. 15) with respect to the plane of the mounting frame 30. The edge of the aperture 36 in the portion 37 of the mounting frame 30 is beveled as indicated at 38. When the transparency 32 is inserted between the halves 34 and 37 in the indented areas 39 of the mounting frame 30 and these portions are sealed together with a suitable adhesive, the curved edge or lip 35 presses against the edge of the transparency 32, causing it to curve downwardly and thereby causing the entire surface of the transparency 34 to assume a compound curvature. The beveled portion 38 permits this downward curving of the edges of the transparency 32 under the pressure exerted on the transparency 32 by the curved or raised lip portion 35. The lip portion 35 may also be formed by a squeezing and bulging action with suitable forming jaws as described above in connection with FIGS. 4–7.

In order to insure the registry of the outer edges of the halves 34 and 37 of the mounting frame 30, cooperating apertures 40 and aperture engaging loops 41 are formed on the two halves of the mounting frame 30. When the mounting frame halves 34 and 37 are folded or otherwise fitted together, the loop 41 enters the apertures 40, thereby properly aligning the two halves together so that the edges of the apertures in the two portions as well as the outer edges of the frame halves are correctly aligned. In the event that the portions of the mounting frame 30 are molded from plastic rather than cut from paper board or metal, a suitable raised portion is molded on the edge of the aperture on one half of the mounting frame which corresponds to the above-described downwardly bent portion 35 and a suitably beveled edge is provided on the corresponding edge of the aperture in place of the above-discussed beveled portion 38.

It will be seen that the invention embodied in the above-described method and means provides an improved slide which has a permanent compound curvature or bow in the transparency and which is thereby effectively prevented from popping during the exhibition of the slide. Since the curvature is formed at the edge of the transparency, the method may be practiced without any danger of injury to the transparencies and without causing the picture portion of the transparencies to be marked or otherwise injured.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

Having thus described my invention, I claim:

1. A slide comprising a transparency mounted between cooperating apertured halves of a slide mount, one of said halves of said slide mount having a raised lip adjacent to the edge of its aperture, said lip being positioned to contact the transparency and to bend it at an angle to the plane of the slide mount whereby the portion of the transparency within the apertures of the slide mount halves assumes a curved shape and said raised lip comprising a bulge of material formed in one of said halves of the slide mount.

2. The slide as claimed in claim 1 in which the aperture in one of said halves of the slide mount is smaller than the aperture in the other of said halves, and said bulge being positioned at the edge of the smaller of the apertures.

3. A slide mount for a transparency comprising the combination of a pair of cooperating paperboard apertured portions, and one of said portions having a raised paperboard bulge portion thereon adjacent to its aperture.

4. In a slide mount for transparencies a transparency framing aperture, a transparency curving means comprising a raised lip portion on the mount adjacent to the edge of the aperture and said lip comprising a bulge of material pressed outwardly from a portion of the slide mount located inwardly of said lip.

5. The method of forming a curvature in a transparency mounted between cooperating halves of an apertured paperboard mounting frame in which the aperture in one half of the frame is larger than the aperture in the other half which comprises the steps of squeezing opposite faces of the mounting frame along lines adjacent to the edges of the apertures and simultaneously advancing the overlapping margins of the smaller aperture toward and into the larger aperture, whereby said margins constitute lips of frame material of greater thickness than the squeezed portions thereof and said lips engage the transparency and force it to assume a curvature into the larger aperture.

References Cited in the file of this patent

UNITED STATES PATENTS

| | | |
|---|---|---|
| 2,184,007 | Staehle | Dec. 19, 1939 |
| 2,338,189 | Libbey et al. | Jan. 4, 1944 |
| 2,527,765 | Roehrl | Oct. 31, 1950 |
| 2,571,764 | Rodger | Oct. 16, 1951 |
| 2,614,950 | Beckley | Oct. 21, 1952 |
| 2,639,254 | Smith | May 19, 1953 |
| 2,639,530 | Merrill | May 26, 1953 |
| 2,656,631 | Cadwell | Oct. 27, 1953 |
| 2,669,279 | Barter | Feb. 16, 1954 |
| 2,806,309 | Goldberg | Sept. 17, 1957 |
| 2,823,476 | Ostergaard | Feb. 18, 1958 |
| 2,842,883 | Folwell | July 15, 1958 |
| 2,863,244 | Lyon | Dec. 9, 1958 |
| 2,917,855 | Schneider | Dec. 22, 1959 |